US010621207B2

(12) United States Patent
Gray et al.

(10) Patent No.: US 10,621,207 B2
(45) Date of Patent: Apr. 14, 2020

(54) EXECUTION OF QUERIES IN RELATIONAL DATABASES (71) Applicant: salesforce.com, inc., San Francisco, CA (US)

(72) Inventors: William Victor Gray, San Francisco, CA (US); Jan Asita Fernando, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1024 days.

(21) Appl. No.: 15/138,704

(22) Filed: Apr. 26, 2016

(65) Prior Publication Data
US 2017/0308604 A1   Oct. 26, 2017

(51) Int. Cl.
*G06F 16/28* (2019.01)
*G06F 16/245* (2019.01)
*G06F 16/22* (2019.01)
*G06N 20/00* (2019.01)

(52) U.S. Cl.
CPC ............ *G06F 16/284* (2019.01); *G06F 16/22* (2019.01); *G06F 16/245* (2019.01); *G06N 20/00* (2019.01)

(58) Field of Classification Search
CPC ....... G06F 16/284; G06F 16/22; G06F 16/245
USPC ......................................................... 707/769
See application file for complete search history.

(56) References Cited

U.S. PATENT DOCUMENTS

| | | | |
|---|---|---|---|
| 7,921,102 B2* | 4/2011 | Cain | G06F 16/24545 707/715 |
| 2009/0287637 A1* | 11/2009 | Day | G06F 16/2237 |
| 2014/0095475 A1* | 4/2014 | Su | G06F 16/24542 707/718 |
| 2014/0129530 A1* | 5/2014 | Raufman | G06F 7/78 707/693 |
| 2017/0278012 A1* | 9/2017 | Prasad | H04L 67/1097 |

\* cited by examiner

*Primary Examiner* — Kimberly L Wilson
(74) *Attorney, Agent, or Firm* — Morris & Kamlay LLP (57) ABSTRACT A learning system is provided to improve the speed of queries in a relational database management system. The learning system may include a query pipeline which utilizes a transform generator and a transform engine to transform uncommitted data corresponding to slow queries, and a query multiplexer to query primary keys of uncommitted data and committed data if the query has been improved by an existing transform.

20 Claims, 6 Drawing Sheets

EXECUTION OF QUERIES IN RELATIONAL DATABASES

BACKGROUND

A relational database management system (RDBMS) may process queries through the use of a predefined index. A relational database of a large table size may contain a large number of rows. As the relational database grows to a very large size, for example, if it contains one or more tables having billions of rows, the costs associated with the creation of additional indexes may become problematic. As a result, new queries may not be adequately processed with a desired level of speed or efficiency. For large relational databases, index creation and maintenance may require human intervention to write indexes or to monitor the creation of indexes. Such human intervention may be highly labor intensive for large databases.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter, and together with the detailed description, serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

According to embodiments of the disclosed subject matter, a learning system is provided to identify and to process slow queries on a relational database management system (RDBMS) store. The learning system may improve the processing of queries in a fast and efficient manner through automatic creation, backfill, and ongoing maintenance of dynamic schema-less predicate dictionaries on a secondary key-value store. In some implementations, the learning system may also perform automated query multiplexing and merging of data through use of these dynamic schema-less predicate dictionaries in conjunction with existing query techniques in an RDBMS query system.

An entity may be represented as a logical collection of fields, such as a collection of name/value pairs, in which the name of each name/value pair is static and known. An entity may be defined by a "shape," which includes one or more characteristics, such as a field, a data type, or an attribute. Relational databases typically use a schema for each database, which includes a strict definition of the shape of data, including, for example, a field name, an order, or a data type. Within a relational database as disclosed herein, each entity represented in the database and/or having data stored in the database may be uniquely identified by a single identification (ID) value, also called a primary key. A relational database store is a store in the relational database that has a fixed schema. As used herein, a key-value store is a data storage paradigm designed for storing, retrieving, and managing associative arrays, which use a data structure also known as a dictionary or hash, in which an entity is uniquely identified by an arbitrary set of ordered fields. Dictionaries typically contain a collection of objects, or records, which in turn have many different fields within them, each containing data. These records are stored and retrieved using a key that uniquely identifies the record, and is used to quickly find the data within the database. In contrast with relational database stores, key-value stores have dynamic schemas.

As used herein, a predicate refers to a single filter condition used in a query to select specific entities. Multiple filter conditions and thus multiple predicates joined by one or more logical operators, such as AND, OR, NOT, NAND, NOR, or XOR, may be used in a query. As used herein, a transform refers to as an operation that changes the representation of a set of complex data without changing the actual semantic meaning of the data itself. Within a relational database system, as used herein, committed data refers to data that has been transformed and stored in the key-value store, whereas uncommitted data refers to data that exists in the relational database store when a transform is pending on the data. As used herein, multiplexing a query refers to merging multiple simultaneous information streams into a single result.

According to embodiments of the disclosed subject matter, the performance of the computer system or the network may be improved by identifying queries that are slow, providing transforms to improve the speed of queries by committing previously uncommitted data in the key-value store, and multiplexing queries by running the queries on both committed data in the key-value store and uncommitted data in the relational database store to process the queries efficiently. In large relational databases that may contain millions or billions of rows of data, significant improvements may be achieved in the speed or efficiency of processing queries that may involve multiple fields or filter conditions joined by multiple logical operators, including, for example, AND, OR, NOT, NAND, NOR, or XOR.

Figure 1:
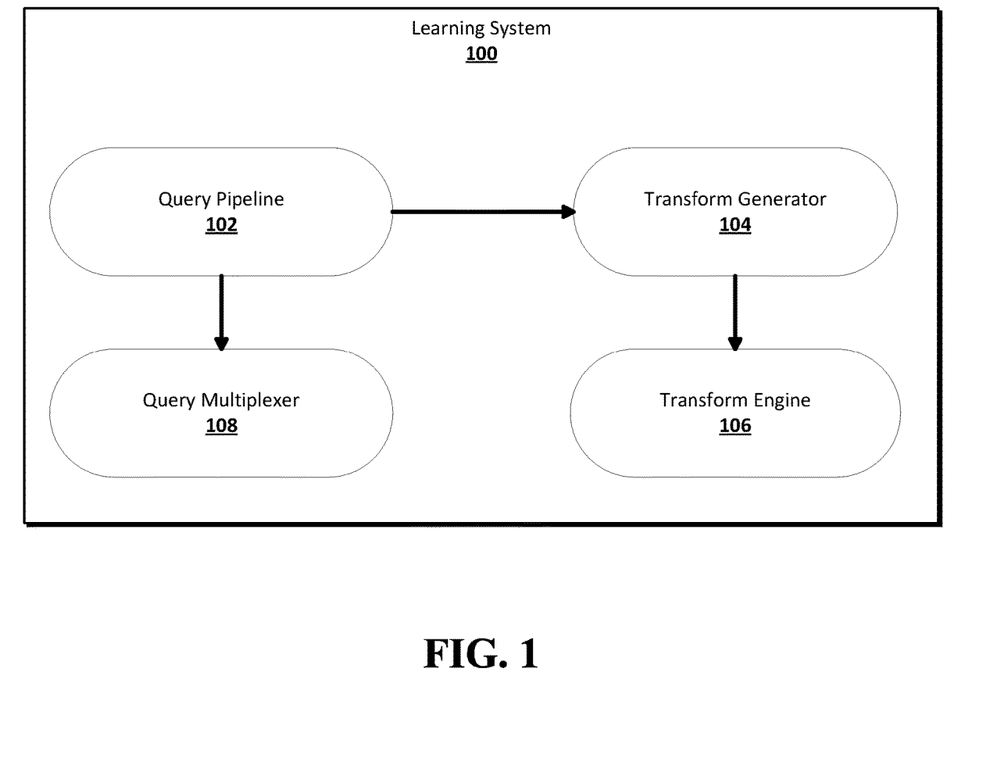
FIG. 1 shows an example of a learning system according to embodiments of the disclosed subject matter.

FIG. 1 shows an example of a learning system according to embodiments of the disclosed subject matter. The learning system 100 may include a query pipeline 102, a transform generator 104, a transform engine 106, and a query multiplexer 108. The query pipeline 102 may be configured to identify queries that have been improved with existing transforms and to pass the queries that have been improved with existing transforms to the query multiplexer 108. The query pipeline 102 also may be configured to pass queries that have not been improved with existing transforms and that have been identified as slow queries to the transform generator 104. An example of a process performed by the query pipeline 102 will be described in further detail below with reference to FIG. 2. An example of a process performed by the transform generator 104 will be described in further detail below with reference to FIG. 3. After a transform is generated for a slow query by the transform generator 104, the transform engine 106 may apply the transform to the slow query. An example of a process performed by the transform engine 106 will be described in further detail below with reference to FIG. 4. In some implementations, a query that has been improved with an existing transform may be transmitted to the query multiplexer 108, which may be configured to split the query into two or more separate queries based on a match between the query predicates and the transform metadata. An example of a process performed by the query multiplexer 108 will be described in further detail below with reference to FIG. 5.

Figure 2:
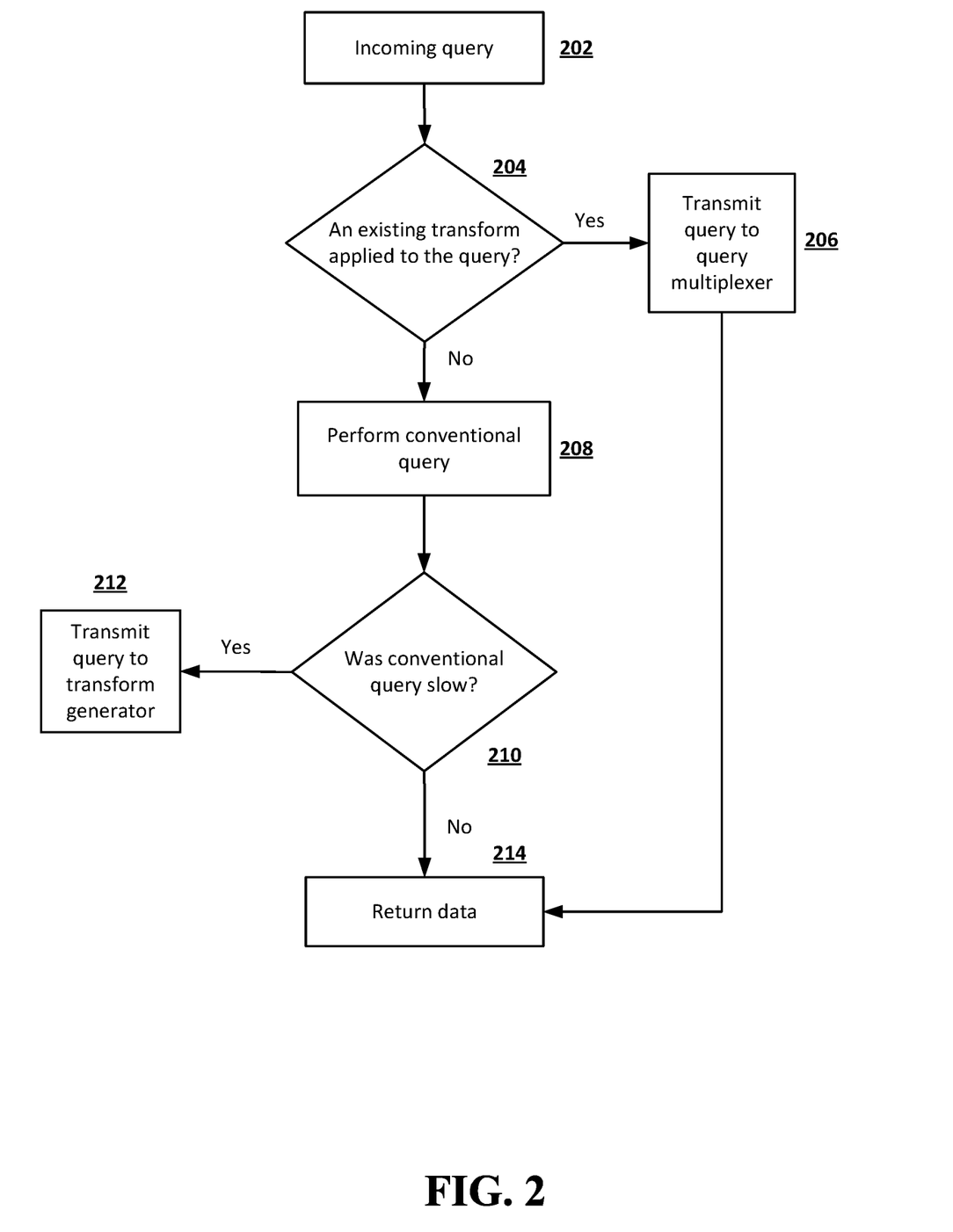
FIG. 2 is a flowchart illustrating an example of processing an incoming query according to embodiments of the disclosed subject matter.

FIG. 2 is a flowchart illustrating an example of processing an incoming query according to embodiments of the disclosed subject matter. In FIG. 2, an incoming query is received in block 202. A determination is made as to whether an existing transform has already been applied to the query in block 204. If it is determined that no existing transform has been applied to the query in block 204, then the query is passed to a query multiplexer in block 206. The query multiplexer may perform a multiplexing process, an example of which will be described below with reference to FIG. 5. After the query multiplexer performs a multiplexing process on the query, data corresponding to the query processed by the query multiplexer is returned in block 214.

If it is determined that no existing transform has been applied in block 204, then a normal or conventional querying process may be performed on the query in block 208. A determination may be made as to whether the conventional querying process performed on the query is "slow" in block 210. In some implementations, the speed of the normal querying process may be compared to a fixed threshold speed to determine whether the query is considered "slow". For example, the speed of the normal querying process may be deemed slow in block 210 if it is lower than the fixed threshold speed. In some implementations, the speed of a normal querying process may be considered slow if it is below a dynamic threshold that is based on queries run in the RDBMS within a selected or define period of time. As a specific example, a normal querying process may be considered "slow" if the speed of the querying process is within the lowest 10 percentile among the speeds of all queries executed in the previous 24 hours. More generally, a dynamic threshold may be selected based on the past execution time of queries in the system, such as a maximum execution time, an average execution time, or the like. Alternatively or in addition, a static threshold speed may be defined in the system, and any query with a greater processing time may be considered "slow". A threshold may be based, for example, on the desired maximum or average execution time of the system, regardless of past performance. If it is determined that the speed of the normal querying process performed on the query is slow in block 210, then the query is passed to a transform generator in block 212. The transform generator may perform a transform generation process, an example of which will be described below with reference to FIG. 3. If it is determined that the normal query process is not slow in block 210, then data corresponding to the query is returned in block 214.

Figure 3:
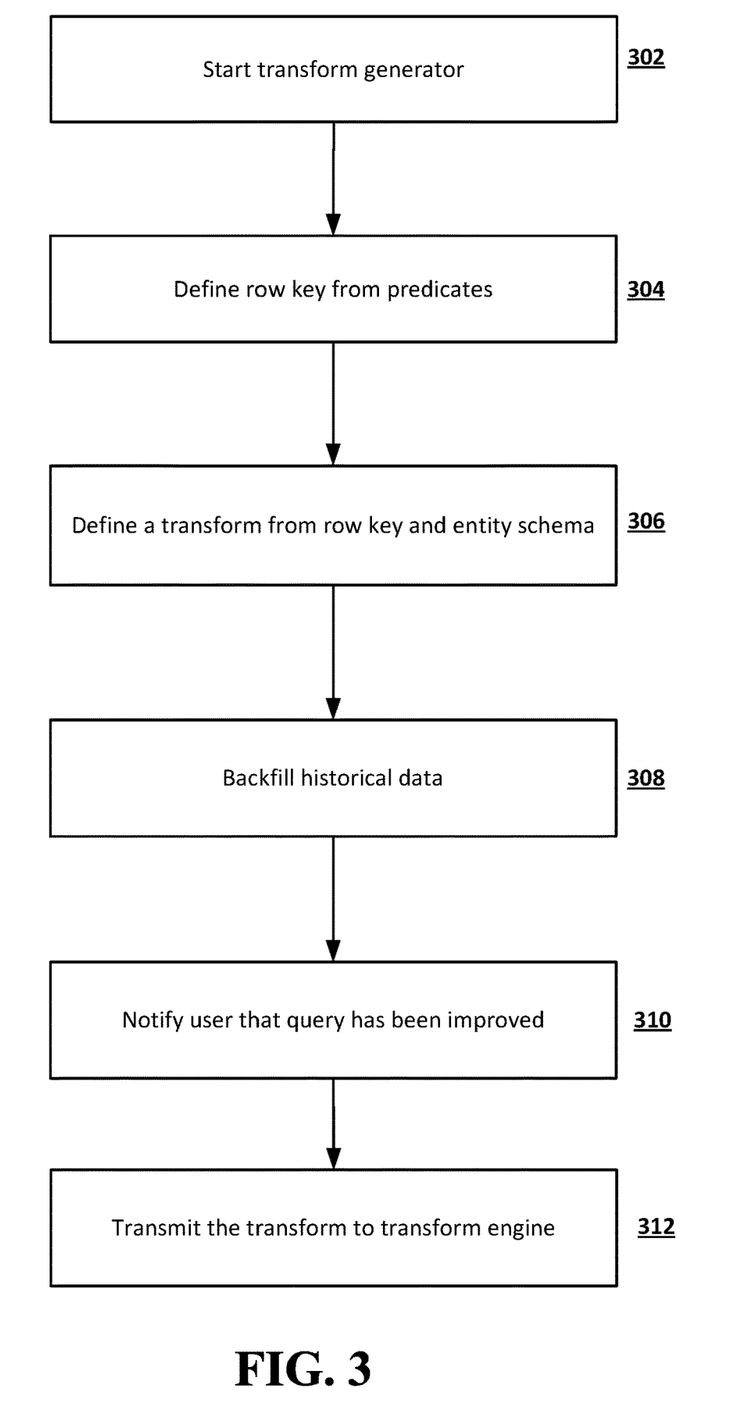
FIG. 3 is a flowchart illustrating an example of generating a transform according to embodiments of the disclosed subject matter.

FIG. 3 is a flowchart illustrating an example of a process of generating a transform if a conventional query is slow as determined in block 210 of FIG. 2 according to embodiments of the disclosed subject matter. In the example shown in FIG. 3, the transform generator starts in block 302. A row key, also called a predicate key, may be defined by the predicates for the query in block 304. A new transform may be defined based on the row key and the entity schema in block 306. Backfilling of historical data in the key-value store may be performed by applying the transformation rule to the historical data in block 308. In some implementations, backfilling of historical data may be beneficial if the existing pipeline system only transforms data that has been modified since the time at which the transform was defined. In order to produce full results, it may be desirable to process existing data through the pipeline before enabling the transform for query improvement. Otherwise, full results may not be obtained if backfilling of historical data is not performed. After the query has been improved with backfilled historical data, a notification that the previously slow query has been improved may be transmitted to the user in block 310. The new transform, which is defined in block 306, may be transmitted to the transform engine in block 312.

Figure 4:
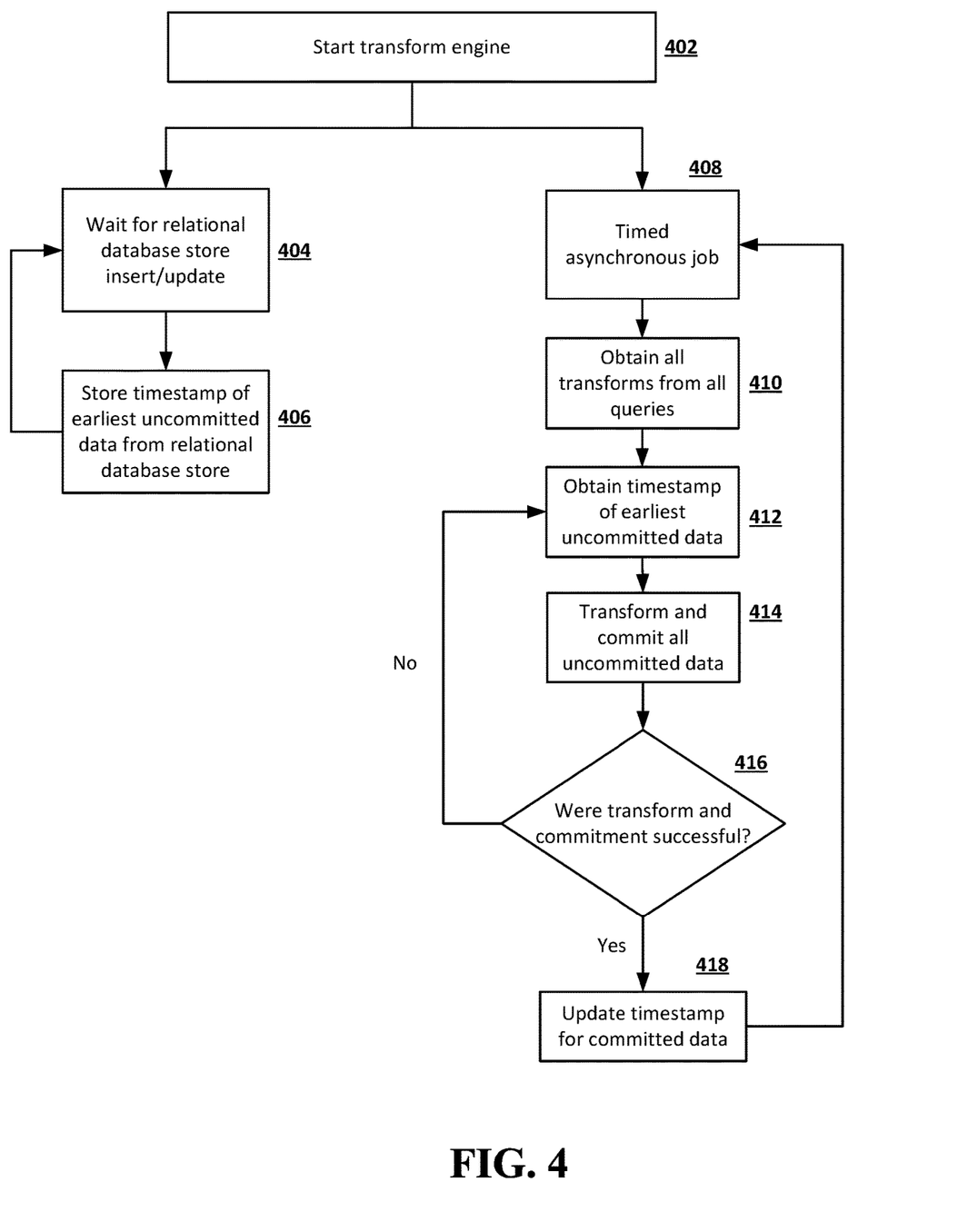
FIG. 4 is a flowchart illustrating an example of transforming and timestamping of previously uncommitted data according to embodiments of the disclosed subject matter.

FIG. 4 shows a flowchart illustrating an example of a process of transforming and timestamping of previously uncommitted data according to embodiments of the disclosed subject matter. The transform engine starts in block 402 and starts two process flows in parallel. In the example shown in FIG. 4, one of the process flows includes processes as shown in blocks 404 and 406 and the other process flow includes processes as shown in blocks 408-418. In block 404, the learning system may wait for relational database store inserts or updates. In some implementations, new rows of data may be inserted or added to the relational database store, and existing rows of the relational database store may be updated with new data while queries are being made to the relational database store. A timestamp of the earliest uncommitted data from the relational database is stored in block 406. In some implementations, the processes of waiting for the relational database store inserts or updates in block 404 and storing the timestamps of the earliest uncommitted data in block 406 may be repeated in a loop as shown in FIG. 4.

Timed asynchronous jobs may be performed in block 408 in a conventional manner, for example, by using a conventional RDBMS scheduler. All transforms from all queries may be obtained in block 410. In some implementations, the transform for each previously identified slow query may be generated by the transform generator in a process shown in FIG. 3 and described above. After all the transforms for all previously identified slow queries are obtained in block 410, a timestamp of the earliest uncommitted data may be obtained in block 412. A benefit of timestamping of the earliest uncommitted data is that it sets the lower limit for data that must be transformed to avoid re-processing of committed data. In some implementations, the timestamp of the earliest uncommitted data may be used to limit the size of uncommitted data that needs to be scanned during query multiplexing. In some implementations, all previously uncommitted data may be transformed and committed in block 414, by using the transforms defined by the transform generator. A determination may be made as to whether the transform and commitment are successful in block 416. If it is determined that the transform and commitment are successful in block 416, then the timestamp is updated in block 418, and additional timed asynchronous jobs may be performed in block 408. In these implementations, commitment and transform of data may be deemed successful when a determination is made that the data is saved in the key-value store. For example, the commitment and transform of the data may be deemed successful based on a response from key-value store. On the other hand, a failure may be inferred from the lack of a response from the key-value store indicating that committed data has been saved in the key-value store. Referring to FIG. 4, if it is determined that the transform and commitment are not successful in block 416, then the processes of obtaining the timestamp of the earliest uncommitted data in block 412 and transforming and committing all previously uncommitted data in block 414 may be repeated until the transform and commitment are successful. In database management systems in which a resilience model is implemented, commitment of data in key-value stores may entail asynchronous processes and one or more repeated attempts until the commitment is successful. In some implementations, if commitment of data to the key-value store is deemed unsuccessful in a given iteration, another attempt may be made in a subsequent iteration to commit newly received uncommitted data in addition to the existing uncommitted data that was unsuccessfully committed in the previous iteration. Such iterations may continue until the data is successfully committed, for a set or selected number of attempts, for a set or selected time period, or the like.

Figure 5:
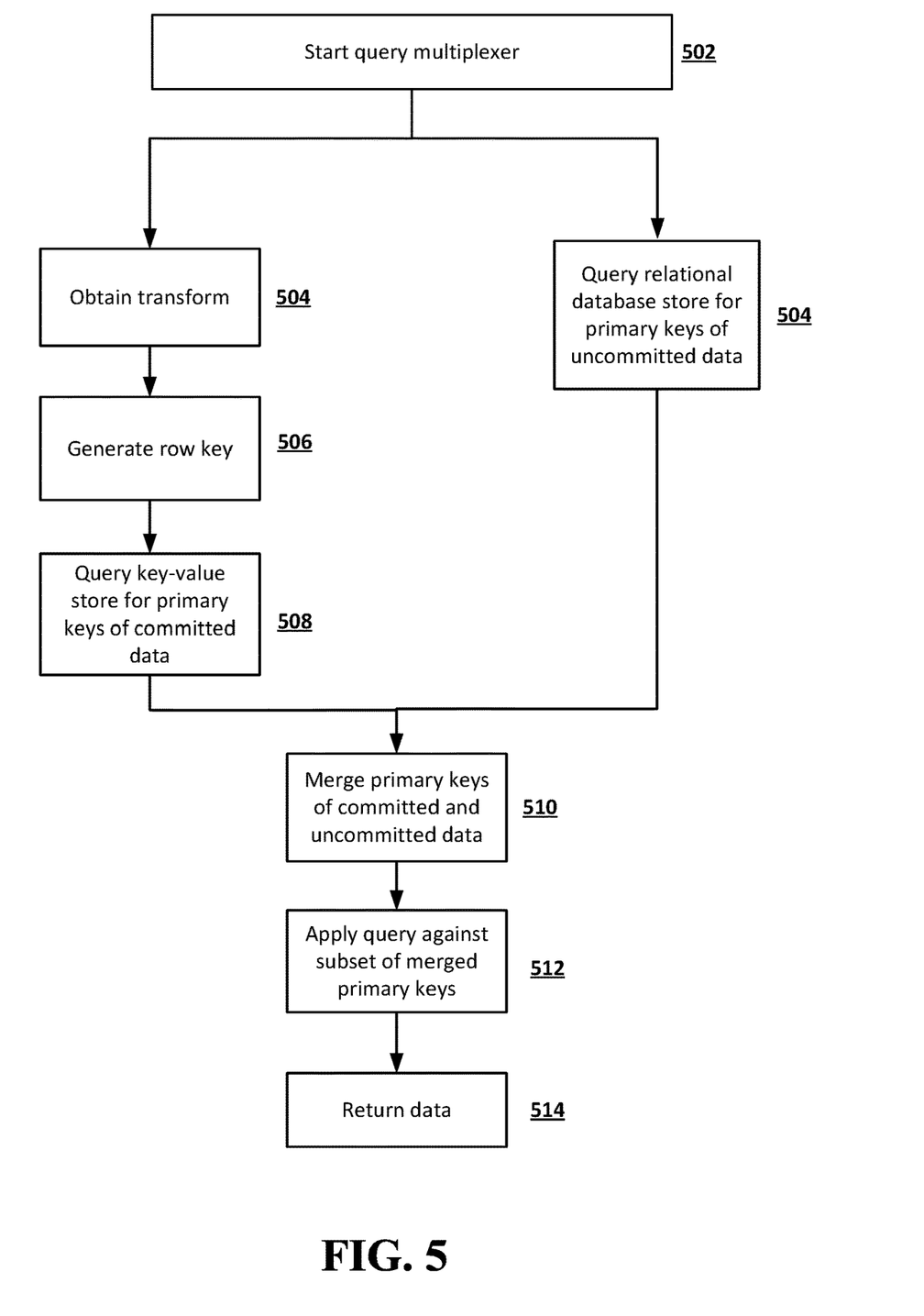
FIG. 5 is a flowchart illustrating an example of query multiplexing according to embodiments of the disclosed subject matter.

FIG. 5 is a flowchart illustrating an example of a process of query multiplexing according to embodiments of the disclosed subject matter. The processing speed of the overall system may be improved by multiplexing queries, which allows the system to run the queries on both committed data in the key-value store and uncommitted data in the relational database store and to merge the results of queries on both the committed data and the uncommitted data. In the example shown in FIG. 2 and described above, a query is passed to the query multiplexer 108 if the query is identified as having been improved with an existing transform in block 204. In the example shown in FIG. 5, the query multiplexer starts in block 502. The incoming query may be split into two or more separate queries. In some implementations, a query may involve uncommitted data from the relational database store and committed data from the key-value store. Primary keys of committed data from the key-value store and primary keys of uncommitted data from the relational database store may be obtained by performing separate processes in parallel, for example. In the example shown in FIG. 5, the relational database store may be queried for primary keys of uncommitted data in block 504. Querying of the relational database store may be achieved by a standard querying method. On the other hand, for committed data, a transform generated by the transform generator may be obtained in block 504, and the transform metadata, which may include a set of multiple fields, the ordering of the fields, and logical operators such as AND, OR, NOT, NAND, NOR, or XOR, to join the fields, may be extracted from the transform. A row key may be generated based on the transform metadata in block 506. The key-value store may be queried for primary keys of committed data in block 508 by using the row key derived from the transform.

After the primary keys of uncommitted data from the relational database store are obtained in block 504 and the primary keys of committed data from the key-value store are obtained in block 508, the primary keys for both uncommitted and committed data are merged in block 510 to form a set of merged primary keys, which includes a subset of primary keys for the relational database store. A query may be applied against the subset of primary keys on the relational database store in block 512, and resultant sets of uncommitted and committed data are merged and returned in block 514. In some implementations, one or more sets of limits, offsets, or orders may be applied to the merged data which includes both uncommitted and committed data.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The learning system for improving the execution speeds of queries disclosed herein may be implemented as a multi-tenant system. The system may include a server that can generate one or more virtual applications based on data stored in a common database shared between the tenants. Each virtual application may provide access to data in the database for each of the one or more tenants utilizing the system. A tenant may, for example, request social media posts, metadata, and/or analytics provider data. Although multiple tenants may share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system may be unique.

Figure 6:
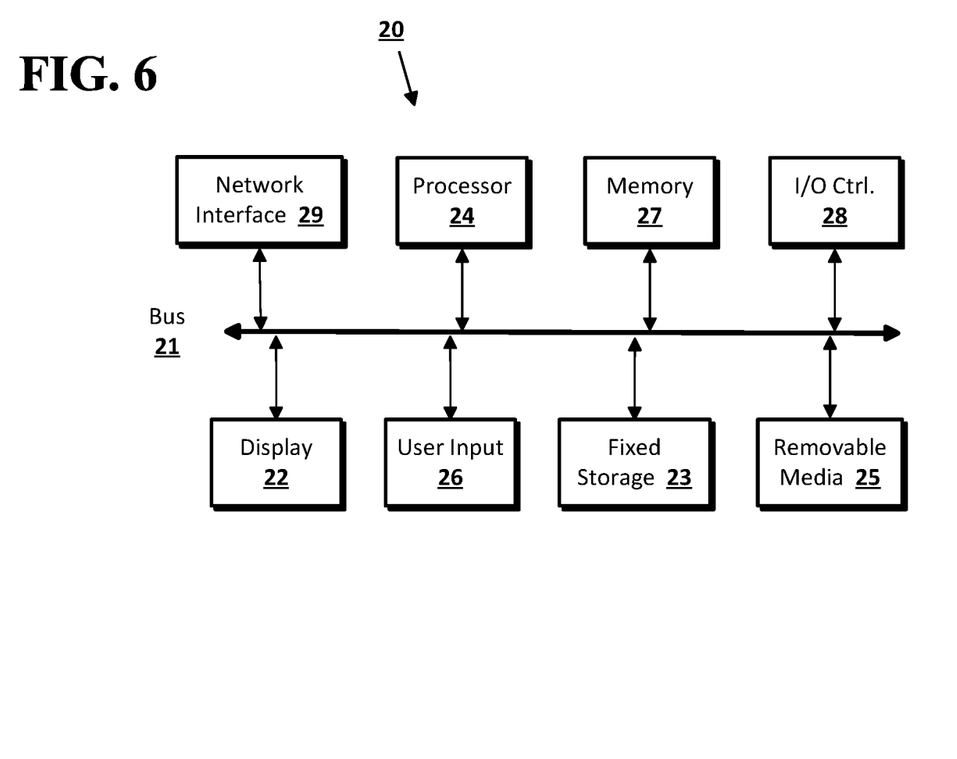
FIG. 6 shows a computer according to an implementation of the disclosed subject matter.

Implementations of the presently disclosed subject matter may be implemented in and used with a variety of component and network architectures. FIG. 6 is an example of a computer 20 suitable for implementations of the presently disclosed subject matter. The example of the computer as shown in FIG. 6 may be a client device, a remote platform or a server in which a learning system for improving the execution speeds of queries, an example of which is shown in FIG. 1 and described above, may be implemented. The example of the computer as shown in FIG. 6 may be configured to perform one or more processes for query pipelining, transform generation, timestamping and transformation of uncommitted data, and/or query multiplexing as shown in one or more of FIGS. 2-5 and described above.

As shown in FIG. 6, the computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fiber Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
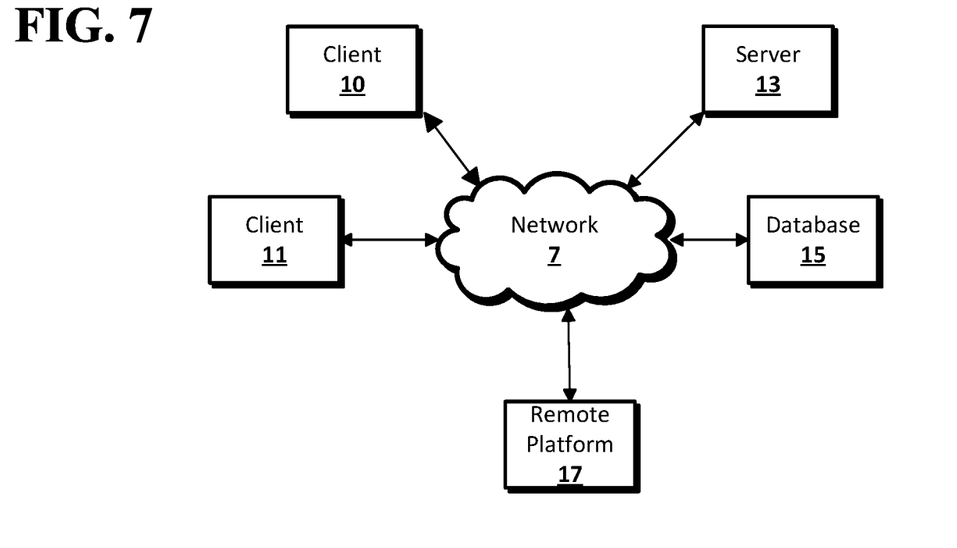
FIG. 7 shows a network configuration according to an implementation of the disclosed subject matter.

FIG. 7 shows an example network arrangement according to an implementation of the disclosed subject matter. One or more clients 10 and/or 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method of processing queries in a database, the method comprising:
   determining whether a first transform has been applied to a query;
   processing the query on committed data in a key-value store or on uncommitted data in a relational database store based on a determination that the first transform has been applied to the query;
   determining whether an execution speed of the query is slower than a threshold speed based on a determination that the first transform has not been applied to the query; and
   applying a second transform to the query and to at least some of the uncommitted data based on a determination that the query is slower than the threshold speed.

2. The method of claim 1, wherein the applying the second transform comprises defining a row key based on one or more predicates of the query.

3. The method of claim 2, wherein the applying the second transform further comprises defining the second transform based on the row key and an entity shape.

4. The method of claim 3, wherein the applying the second transform further comprises backfilling historical data in the key-value store.

5. The method of claim 1, wherein the applying the second transform further comprises storing a timestamp of earliest uncommitted data received from the relational database store to set a time limit for data to be transformed by the second transform to avoid re-processing of the committed data.

6. The method of claim 5, wherein the applying the second transform further comprises:
   transforming previously uncommitted data including the earliest uncommitted data; and
   committing the previously uncommitted data.

7. The method of claim 6, further comprising:
   determining that transforming the previously uncommitted data is a success based on a response from the key-value store indicating that the previously uncommitted data has been saved in the key-value store; and
updating a timestamp for the committed data based on a determination that the transforming the previously uncommitted data is the success.

8. The method of claim 6, further comprising:
determining that the transforming the previously uncommitted data is a failure based on a lack of the response from the key-value store indicating that the previously uncommitted data has been saved in the key-value store; and
based upon the failure:
obtaining a second timestamp of the earliest uncommitted data;
transforming the previously uncommitted data; and
committing the previously uncommitted data.

9. The method of claim 1, wherein the processing the query on the committed data in the key-value store or on the uncommitted data in the relational database store based on the determination that the first transform has been applied to the query comprises:
obtaining transform metadata for the first transform;
generating a row key based on the transform metadata; and
obtaining a first plurality of primary keys of the committed data in the key-value store.

10. The method of claim 9, wherein the processing the query on the committed data in the key-value store or on the uncommitted data in the relational database store based on the determination that the first transform has been applied to the query further comprises obtaining a second plurality of primary keys of the uncommitted data in the relational database store.

11. The method of claim 10, wherein the processing the query on the committed data in the key-value store or on the uncommitted data in the relational database store based on the determination that the first transform has been applied to the query further comprises merging the first plurality of primary keys of the committed data and the second plurality of primary keys of the uncommitted data to generate a set of merged primary keys.

12. The method of claim 11, wherein the processing the query on the committed data in the key-value store or on the uncommitted data in the relational database store based on the determination that the first transform has been applied to the query further comprises merging the uncommitted data and the committed data to generate merged data.

13. The method of claim 1, wherein the threshold speed is selected from a group consisting of: a fixed threshold speed and a dynamic threshold speed.

14. A system for improving execution speeds of queries in a database, the system comprising:
a processor; and
a memory communicably coupled to the processor, the memory including computer instructions configured to cause the processor to:
determine whether a first transform has been applied to a query;
process the query on committed data in a key-value store or on uncommitted data in a relational database store based on a determination that the first transform has been applied to the query;
determine whether an execution speed of the query is slower than a threshold speed based on a determination that the first transform has not been applied to the query; and
apply a second transform to the query and to at least some of the uncommitted data based on a determination that the query is slower than the threshold speed.

15. The system of claim 14, wherein the computer instructions further comprise computer instructions to cause the processor to:
define a row key based on one or more predicates of the query; and
define the second transform based on the row key and an entity shape.

16. The system of claim 15, wherein the computer instructions further comprise computer instructions to cause the processor to:
transform previously uncommitted data; and
commit the previously uncommitted data.

17. The system of claim 16, wherein the computer instructions further comprise computer instructions to cause the processor to:
obtain transform metadata for the first transform;
generate a row key based on the transform metadata;
obtain a first plurality of primary keys of the committed data in the key-value store;
obtain a second plurality of primary keys of the uncommitted data in the relational database store; and
merge the first plurality of primary keys of the committed data and the second plurality of primary keys of the uncommitted data to generate a set of merged primary keys.

18. A system for improving execution speeds of queries in a database, the system comprising:
a processor configured to:
determine whether an execution speed of a query has been improved with a first transform;
process the query on committed data in a key-value store or on uncommitted data in a relational database store based on a determination that the execution speed of the query has been improved with the first transform;
determine whether the execution speed of the query is slower than a threshold speed based on a determination that the execution speed of the query has not been improved with the first transform; and
improve the execution speed of the query with a second transform based on a determination that the query is slower than the threshold speed, wherein the second transform is applied to at least some of the uncommitted data.

19. The system of claim 18, wherein the processor is further configured to:
obtain transform metadata for the first transform;
generate a row key based on the transform metadata;
obtain a first plurality of primary keys of the committed data in the key-value store;
obtain a second plurality of primary keys of the uncommitted data in the relational database store; and
merge the first plurality of primary keys of the committed data and the second plurality of primary keys of the uncommitted data to generate a set of merged primary keys.

20. The system of claim 18, wherein the processor is configured to:
define a row key based on one or more predicates of the query; and define the second transform based on the row key and an entity shape.

\* \* \* \* \*